(12) United States Patent
McQueen (10) Patent No.: US 12,277,476 B2
(45) Date of Patent: Apr. 15, 2025

(54) ANTI-THEFT SCANNING SYSTEM AND METHODS OF DETECTING THEFT

(71) Applicant: DATALOGIC USA, INC., Eugene, OR (US)

(72) Inventor: Alexander M. McQueen, Eugene, OR (US)

(73) Assignee: Datalogic USA, Inc., Eugene, OR (US)

( * ) Notice: Subject to any disclaimer, the term of this patent is extended or adjusted under 35 U.S.C. 154(b) by 491 days.

(21) Appl. No.: 17/560,810

(22) Filed: Dec. 23, 2021

(65) Prior Publication Data

US 2023/0206016 A1    Jun. 29, 2023

(51) Int. Cl.
| | |
|---|---|
| *G06K 7/14* | (2006.01) |
| *G06V 10/20* | (2022.01) |
| *G06V 20/40* | (2022.01) |
| *G06V 20/52* | (2022.01) |
| *G07G 1/00* | (2006.01) |

(52) U.S. Cl.
CPC ......... *G06K 7/1447* (2013.01); *G06V 10/255* (2022.01); *G06V 20/44* (2022.01); *G06V 20/52* (2022.01); *G07G 1/0063* (2013.01); *G07G 1/0072* (2013.01)

(58) Field of Classification Search
CPC .... G06K 7/1447; G06V 10/255; G06V 20/44; G06V 20/52; G07G 1/0072
See application file for complete search history.

(56) References Cited

U.S. PATENT DOCUMENTS

| | | |
|---|---|---|
| 7,100,824 B2 | 9/2006 | Ostrowski et al. |
| 7,246,745 B2 | 7/2007 | Hudnut et al. |
| 7,646,887 B2 * | 1/2010 | Goncalves ............. G06V 10/25 235/383 |
| 8,068,674 B2 | 11/2011 | Goncalves |
| 8,448,858 B1 * | 5/2013 | Kundu ................... G07G 3/003 235/383 |
| 8,474,715 B2 | 7/2013 | Goncalves |
| 8,571,298 B2 | 10/2013 | Mcqueen et al. |
| 9,004,359 B2 | 4/2015 | Shearin et al. |
| 9,152,828 B2 | 10/2015 | Goncalves et al. |

(Continued)

FOREIGN PATENT DOCUMENTS

| | | | | |
|---|---|---|---|---|
| CN | 106990914 B | * | 6/2020 | ........... G06F 3/0608 |
| WO | WO-2014063157 A2 | * | 4/2014 | ......... G06K 7/10861 |

*Primary Examiner* — Bobbak Safaipour
*Assistant Examiner* — Ashley L. Hytrek
(74) *Attorney, Agent, or Firm* — Cozen O'Connor (57) ABSTRACT

Disclosed herein are components, systems, and methods of a scanning system that operates in a retail environment to deter and prevent theft of items. The systems and methods include a plurality of imagers to capture a plurality of images of the item, and identifying key feature locations of the item based on the captured images. The systems and methods include a scanner to read a machine-readable symbol attached to the item, and accessing a database that includes stored key feature data associated with the specific machine-readable symbol attached to the item. The systems and methods further include one or more processors that generate key feature data for the item based on the key feature locations, compares the stored key feature data with the generated key feature data, and determines whether the stored key feature data matches the generated key feature data to a degree sufficient to surpass a predetermined threshold.

20 Claims, 6 Drawing Sheets

(56) References Cited

U.S. PATENT DOCUMENTS

| | | | |
|---|---|---|---|
| 10,534,948 B1* | 1/2020 | Walters | G06V 10/50 |
| 10,839,181 B1* | 11/2020 | Fjellstad | G07G 3/003 |
| 2014/0014722 A1* | 1/2014 | Goncalves | G06V 20/52 |
| | | | 235/383 |
| 2021/0295078 A1* | 9/2021 | Barkan | G06V 30/2247 |
| 2023/0005342 A1* | 1/2023 | Brakob | G07G 1/0045 |

* cited by examiner

ANTI-THEFT SCANNING SYSTEM AND METHODS OF DETECTING THEFT

BACKGROUND

Technical Field

The present disclosure relates to image-based systems, for example image-based systems that automatically detect, monitor and track objects in an environment, for instance in a retail store.

Description of the Related Art

For a number of years now, various-sized retail stores have installed security cameras to observe checkout transactions, both in operator-assisted lanes and at Self-Check-Out (SCO) systems. These security cameras are often installed at elevated locations that provide a more distant, overhead viewpoint of transactions. With the advent of digital imaging scanners used for barcode and other symbology detection, these devices have also been deployed in the same environments. Relatively recent advances in Artificial Intelligence (AI) and Machine Learning (ML) technologies have been coupled with these various checkout-viewing imaging systems in an attempt to detect theft in these environments.

One of the often-used theft techniques is referred to as the "bypass" method, where items are moved directly from a customer's cart to a bag without first being scanned. This type of theft is checked in SCO systems by strategically-placed weigh scales, but when performed by store employees in assisted checkout lanes (referred to as "sweethearting"), it is often harder to detect. The overhead/elevated security cameras and other scanners linked to ML analyses have been used to monitor and detect these forms of theft, but the distant-view vantage points at which the devices are mounted can miss subtleties in the theft techniques.

Similarly, cameras have been linked with ML systems to perform the same type of theft detection, but in this case the close-in, narrower fields-of-view of the cameras may be easily bypassed by items moved just outside these fields-of-view. Other theft techniques, such as item substitution, barcode label substitution, or covering of a barcode are also often hard to detect in many instances.

Another drawback with many security cameras linked to ML systems is the fact that they often need extensive training using video or other image examples of both normal and suspicious activity to correctly classify the observed activity with high confidence. This training of the system will often require further updates to the training (e.g., to remain current with new, updated, seasonal, etc. packaging), which also requires significant effort and in-store equipment updates.

Another security problem, especially at SCO systems, is that a thief will scan a barcode label from a lower-priced product and then place the actual, higher-priced product in their bag or cart. Alternatively, the thief may just cover the barcode or pass the item far from the scanner's reading zone, just pretending to scan the item before moving it into their possession.

Known systems that attempt to remedy this type of theft include imaging security systems that observe contents of carts and baskets for items potentially not scanned. Often these systems use some method of attempting to detect one or more features (e.g., unique identifying features) of the items and then searching an extensive database for similar features to identify the items. Some systems deploy a form of AI to assist in the search and identification process.

These systems require collection of many images of all the items to be identified, and their addition to a large database. This database must be constantly kept up-to-date, as new items and/or current items with freshened packaging are constantly appearing in a store's inventory.

Another type of theft prevention system uses surreptitious encoded information which can display the product UPC/EAN/GTIN, etc. in a humanly undetectable form, which may be compared to the barcode information to confirm a matching identity. The hidden/encoded information may include "digital watermarking" or an invisible ink, for example. In these cases, the concealed information may only be decipherable over a narrow range of distances, skew angles, etc. due to limited resolution or geometric distortion constraints. Thus, this surreptitious encoded information may be detected when an item is within a reasonable range of the scanner, but not visible by a pole-mounted (or other elevated) security camera viewing the cart/bagging area for example.

BRIEF SUMMARY

The present disclosure describes embodiments of a system that can detect potential cases of theft without the need for training of ML systems, collecting large databases of images, or the necessity of maintaining and updating large data sets of unique features of items.

According to one embodiment, the system makes use of a technique designed to detect items in the lower parts of typical shopping carts, such as Datalogic's LaneHawk system and its derivatives, described in U.S. Pat. No. 7,100,824 entitled "System and methods for merchandise checkout" issued Sep. 5, 2006, the disclosure of which is hereby incorporated by reference in its entirety. In general, such a system uses matching of unique features on an item within the system's field-of-view to similar unique features in a large data set (e.g., a data base). The data set for these extant systems is not only large, but also must be constantly maintained and updated with new products and new product appearances.

The system, according to one embodiment, can generate its own set of unique item features and compare them, in stages, as an item is selected and transferred from a customer's cart or basket to the customer's bag, presumably passing over a scanning device mid-transfer. The database of generated features is very small compared to those employed in known theft deterrent systems, such as the LaneHawk system, because the database can be cleared at the end of each item transfer or at least at the end of a complete transaction. This enables a search that matches key features of the item to be performed very quickly. The use of an ad hoc database tied only to a single item or order may not require any curating, maintenance, or long term attention.

According to one embodiment, a system that verifies that an item scanned at checkout substantially matches expected characteristics, whether at the point of barcode scanning, or where the item is placed in a customer's cart or bag, may include a second device, in addition to the traditional barcode scanner, in the vicinity of these areas which can read corroborating data of the item for comparison. In the case of bagging and cart areas, a second barcode scanner may be impractical because the chances of the second barcode scanner being able to read the barcode data or other relatively spatially dense information on the item when the customer is not intentionally trying to scan the item are minimal.

The item's coded information may be oriented randomly, perhaps moved rapidly, partially obscured, etc., and unless the device has an extremely large Depth-Of-Field (DOF), the coded information may not typically be resolvable anyway, especially by more distant cameras. Typical item identification data, such as barcodes and watermarks as used in the Datalogic LaneHawk system have relatively "fine" features. These markings are typically read or scanned with a system that has substantial Modulation Transfer Function (MTF) at higher frequencies in order to be resolved and detected.

The system described herein may employ monitoring a scanning region(s) and/or the cart/bagging region(s) and identifying an item using lower spatial frequency, or "gross" feature information. Gross features of an item could include characteristics such as prominent/dominant colors, absent colors, color mixes, color shape, item shape, item temperature, item weight, etc., which may be detectable over greater distances, orientations, and speeds.

To enable the system to detect these large, low spatial modulation features (i.e., gross features) and compare them to expected values without the need for extra databases, the item being scanned must carry this information about the gross features on its exterior. One embodiment of encoding gross feature information would be inclusion of a digital watermark, which may essentially cover a product. The encoded gross feature information is readable by the checkout scanner as the customer tries to scan the barcode or pretends to scan the barcode while covering or substituting another barcode.

During this phase, the deliberate act (or fake act) of scanning a barcode brings the watermark into a reasonable proximity, angle and speed, so its gross feature data is likely to be captured by the system. Alternatively, some 2D or other symbology "tiles", which may or may not be near or surrounding the product barcode, could carry the gross feature information. According to one embodiment, some other version of encoded printing could be used (e.g., invisible ink(s) may be implemented).

The gross feature information may be a list of dominant colors on the package or ratio of colors or some simplified version of compressed color histogram information. The color data descriptors could be reduced in number of needed bits of information by using color component values, such as red, green, and blue, or hue, saturation, and brightness, or other color spaces, with a coarser resolution, such as four bits per component, for example.

The information may also or alternatively contain a basic description of product shape, product weight, etc. In the case of encoded weight data, which could be divided into, for example, just a few classes, detection could comprise using typical image processing techniques. These techniques may determine if the customer was using one or two hands to move an item into the cart or bag, and perhaps how quickly. Depending upon the known weight class and the item handling detection, the system could make a rough probability guess as to the likelihood of a match, and use this as part of an overall "suspicion index" with appropriate weightings for different gross feature detection components.

The encoded gross feature information may be contained in the item/package artwork, thus enabling the encoded gross feature information to be updated with any gross feature item changes so that the barcode data and gross feature data remain consistent for a given package, without the need for maintaining extra data sets.

Thus, the device or devices of the system monitoring the scanning region(s) and the cart/bagging region(s) may be simple, low resolution color cameras, such as the type used for security purposes already. These cameras may be placed at relatively large distances, such as overhead or on a stanchion, which afford a larger view of the activities in these regions.

According to one embodiment, a method of operation of the system may include a customer taking an item from their basket or cart and scanning the barcode (or feigning scanning the item) in the vicinity of a barcode scanner. The method may further include detecting, with the barcode scanner a barcode, and further detecting encoded gross feature information of the item. The method may further include comparing stored gross feature information associated with the scanned barcode with the actual detected encoded gross feature information of the item at the point of scanning. The method may further include determining if there is a substantial mismatch between the stored gross feature information associated with the scanned barcode and the detected encoded gross feature information, and in the event of a determination that there is a substantial mismatch, sending a notification to an operator or security system.

The system may include components that enable functionality for the system to grade or rate mismatches. For example, the system may detect color(s) of the item. The item may be known (e.g., according to the stored gross feature information) to have a certain color component that is completely absent from the item. If the system detects a significant amount of the unexpected (i.e., absent according to the stored gross feature information) color component, then the mismatch may be ranked as more highly suspicious.

Standard image processing techniques may be applied to remove customers' hands from color consideration, etc. As mentioned before, a "suspicion index" function may be calculated based upon multiple weighted factors. Various system actions may be triggered based upon the suspicion index, such as merely logging information, alerting a local attendant with a low level display message, alerting an attendant with a higher level message, sounding an alarm, etc.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn, are not necessarily intended to convey any information regarding the actual shape of the particular elements, and may have been solely selected for ease of recognition in the drawings.

DETAILED DESCRIPTION

In the following description, certain specific details are set forth to provide a thorough understanding of various disclosed embodiments. However, one skilled in the relevant art will recognize that embodiments may be practiced without one or more of these specific details, or with other methods, components, materials, etc.

Unless the context requires otherwise, throughout the specification and claims which follow, the word "comprise" and variations thereof, such as, "comprises" and "comprising" are to be construed in an open, inclusive sense that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. For example, certain features of the disclosure which are described herein in the context of separate embodiments may also be provided in combination in a single embodiment. Conversely, various features of the disclosure that are described in the context of a single embodiment may also be provided separately or in any subcombination.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise. Reference herein to two elements "facing" or "facing toward" each other indicates that a straight line can be drawn from one of the elements to the other of the elements without contacting an intervening solid structure.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein.

Aspects of the disclosure will now be described in detail with reference to the drawings, wherein like reference numbers refer to like elements throughout, unless specified otherwise. Certain terminology is used in the following description for convenience only and is not limiting. The term "plurality", as used herein, means more than one. The terms "a portion" and "at least a portion" of a structure include the entirety of the structure.

The headings and Abstract of the Disclosure provided herein are for convenience only and do not interpret the scope or meaning of the embodiments.

Figure 1:
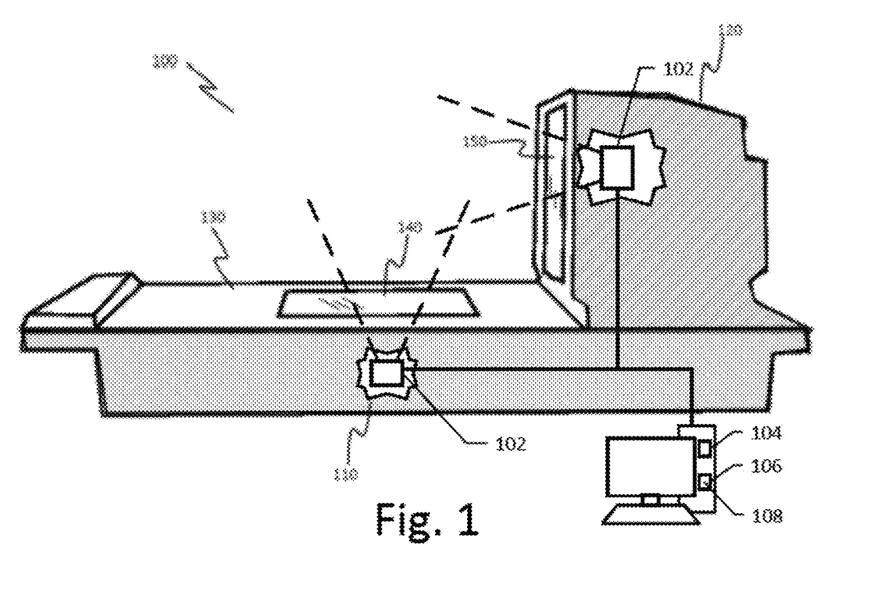
FIG. 1 is an isometric view of a scanning system, according to one embodiment.

Referring to FIG. 1, a scanning system 100 may include one or more enclosures (e.g., a first enclosure 110 and a second enclosure 120). As shown, the one or more enclosures may include one or more windows (e.g., a first window 140 and a second window 150). The one or more windows may provide line of sight for one or more components within the one or more enclosures to an item located outside the one or more enclosures. According to one embodiment, the one or more components may include one or more scanners 102 (e.g., barcode scanners, QR code readers, etc.) that are able to "read" a printed code on an item that contains or is associated with information (e.g., identification, price, etc.) related to the item.

The one or more scanners 102 may include scanning or laser-based (i.e., flying spot) type machine-readable symbol readers, which scan a relative narrow beam or spot of light sequentially across the machine-readable symbol. The reflectance of the narrow beam or spot of light from a machine-readable symbol is detected and decoded. Alternatively, or additionally, the one or more scanners 102 may include an imager or image-based machine-readable symbol reader, which captures a 1D or a 2D image as a snapshot. Image-based machine-readable symbol readers typically employ flood illumination to simultaneously illuminate the entire machine-readable symbol, either from dedicated active light sources, or in some instances using ambient light.

The one or more windows may be described as openings in the respective enclosure. Each of the one or more windows may include a cover (e.g., a transparent pane of, for example, glass or plastic) that allows passage of light while blocking particles (e.g., dust and debris) from entering an interior of the respective enclosure.

For example, the first enclosure 110 may include the first window 140, and the first window may be oriented "horizontally" (i.e., substantially parallel to the ground upon which the scanning system 100 rests). The second enclosure 120 may include the second window 150, and the second window may be oriented substantially perpendicular to the first window 140. As shown the second window 150 may be oriented "vertically" (i.e., substantially perpendicular to the ground upon which the scanning system 100 rests). According to one embodiment, the first window 140 and the second window 150 may be oriented relative to one another at an oblique angle. Such scanners are typically referred to as "bioptic scanners" or "multiple plane scanners." Some embodiments of the disclosure may include "single plane scanners" in which a single scanner plane may be employed (e.g., either horizontal or vertical) without the other plane. Some embodiments may be supplemented by different views, such as those offered by a connected top-down reader (TDR) or other peripheral cameras. An example of such a top-down reader is described in U.S. Pat. No. 9,004,359 entitled "Optical scanner with top down reader" issued Apr. 14, 2015, the disclosure of which is hereby incorporated by reference in its entirety.

Although the illustrated embodiment includes one window in each respective enclosure, according to another embodiment the scanning system 100 may include only one enclosure with multiple windows (e.g., both the first window 140 and the second window 150). Additionally, each of the one or more enclosures may include multiple windows (e.g., adjacent to one another and/or discreet from one another, etc.). The one or more enclosures may be arranged such that one of the one or more enclosures is supported by another of the one or more enclosures. As shown, the second enclosure 120 is supported by (e.g., sits on top of) the first enclosure 110.

The scanning system 100 may include a weighing system 130 that weighs item(s) that are placed upon designated portions of the scanning system 100. As shown, the weighing system 130 may include a horizontal surface (e.g., a surface that forms the horizontal window 140).

Figure 2:
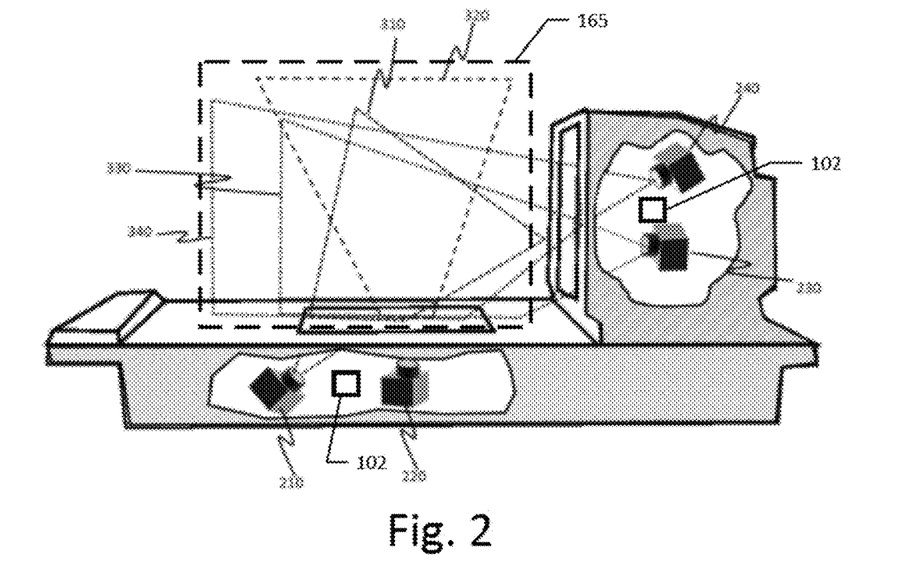
FIG. 2 is an isometric view of the scanning system illustrated in FIG. 1, with partial cutouts to show internal components of the scanning system, according to one embodiment.

Referring to FIGS. 1 and 2, the scanning system 100 may include a plurality of imagers (e.g., a first imaging camera 210, a second imaging camera 220, a third imaging camera 230, and a fourth imaging camera 240). As shown, the imagers may be positioned within the one or more enclosures such that each of the imaging cameras 210, 220, 230, and 240 has a unique field of view (e.g., a first field of view 310, a second field of view 320, a third field of view 330, and a fourth field of view 340, respectively) through one of the one or more windows. The scanning system 100 may define a scanning zone 165 (e.g., a summation of the fields of view of each of the plurality of imagers. As shown, the fields of view may overlap such that certain regions of an exterior of the scanning system 100 are within more than one of the fields of view. According to one embodiment, at least some of the imagers may be positioned such that their respective field(s) of view do not overlap with any other fields of view of the plurality of imagers.

As shown in the illustrated embodiment, the first imaging camera 210 and the second imaging camera 220 may be positioned within the first enclosure 110 such that the first field of view 310 and the second field of view 320 are aligned with the first window 140, which provides line of sight for both the first imaging camera 210 and the second imaging camera 220 to the exterior of the scanning system 100. One or more of the scanners 102 may be positioned within the first enclosure 110 (e.g., with the first imaging camera 210 and the second imaging camera 220) such that a field of view of the one or more scanners 102 are aligned with the first window 140, which provides line of sight for the scanner 102 to the exterior of the scanning system 100.

Additionally, the third imaging camera 230 and the fourth imaging camera 240 may be positioned within the second enclosure 120 such that the third field of view 330 and the fourth field of view 340 are aligned with the second window 150, which provides line of sight for both the third imaging camera 230 and the fourth imaging camera 240 to the exterior of the scanning system 100.

Although the illustrated embodiment includes two imagers in each respective enclosure, according to another embodiment the scanning system 100 may include only one imager within one or more of the one or more enclosures. Additionally, the scanning system may include more than two (e.g., three, four, etc.) imagers within one or more of the one or more enclosures. According to one embodiment, the first enclosure 110 may include a different number of imagers than the number of imagers within the second enclosure 120. Further, the imagers within one of the one or more enclosures may be positioned so as to have discreet windows providing line of sight to the scanning region.

For example, the first enclosure 110 may include a number of windows equal to the number of imagers positioned within the first enclosure 110, and each of the number of windows may be aligned with a respective one of the number of imagers such that the respective field of view passes through the respective window. In use, the plurality of imagers may be positioned such that the scanning system 100 may capture multiple unique views (e.g., simultaneously) of an item passing through the scanning zone 165. According to one embodiment, multiple ones of the plurality of imagers may be mounted on a common circuit board. The scanning system 100 may include one or more mirrors (not shown), positioned to modify the field(s) of view of one or more of the plurality of imagers. Other embodiments include one or more imagers being self-contained within its own separate camera module mounted within the enclosure, and which may couple to a common circuit board (e.g., via a cable) that may provide processing operations for the image data captured by the different imagers.

Figure 3:
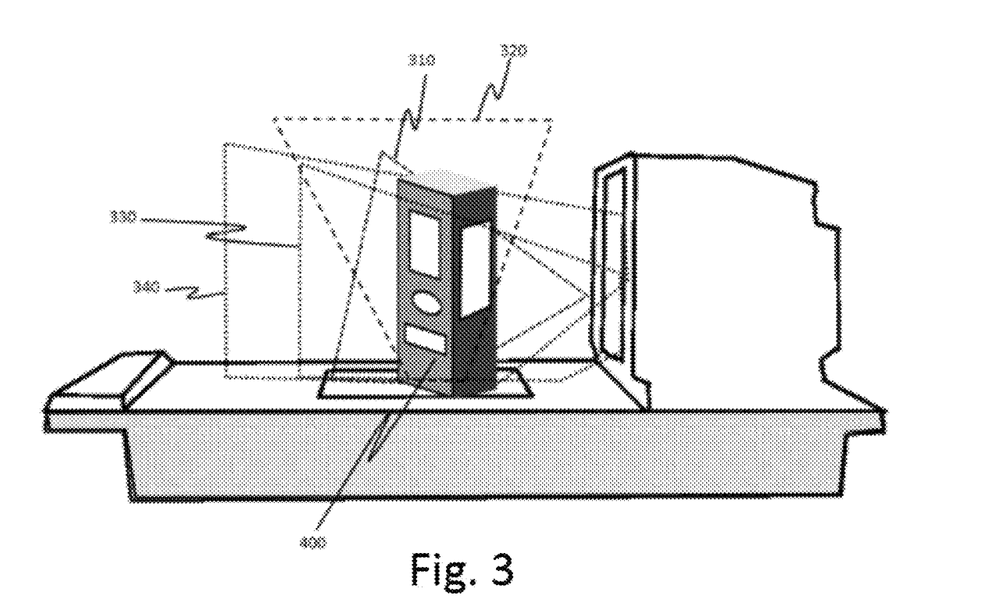
FIG. 3 is an isometric view of the scanning system illustrated in FIG. 1 scanning an item, according to one embodiment.

Referring to FIGS. 1 to 3, the scanning system 100 may be used to observe an item 400 within the scanning region. Different ones of the imagers are positioned such that their respective field of view intersects different portions of the item 400. As shown the item 400 may be positioned such that multiple fields of view intersect the item 400 from different angles and orientations.

Figure 4:
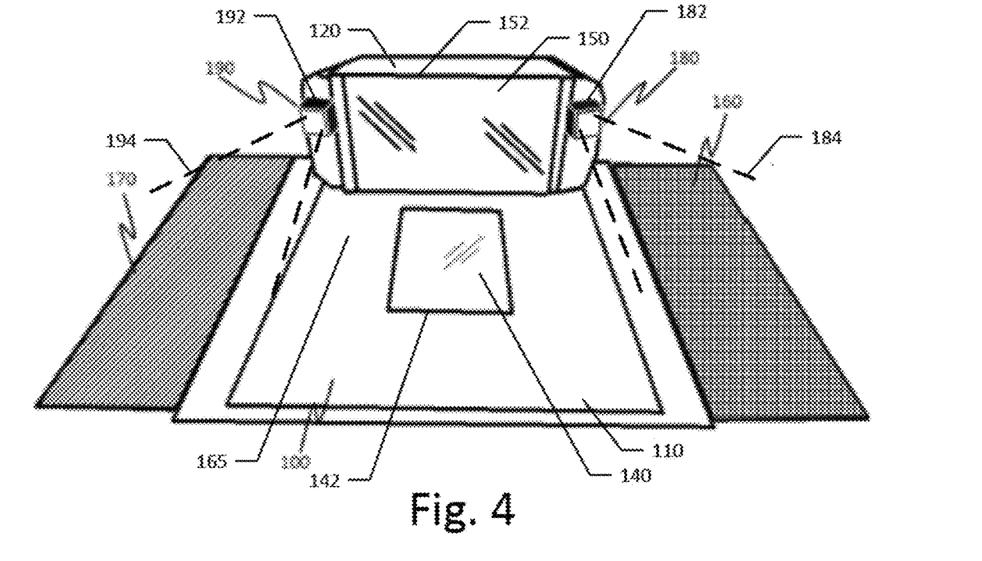
FIG. 4 is an isometric view of a scanning system, according to another embodiment.
Figure 5:
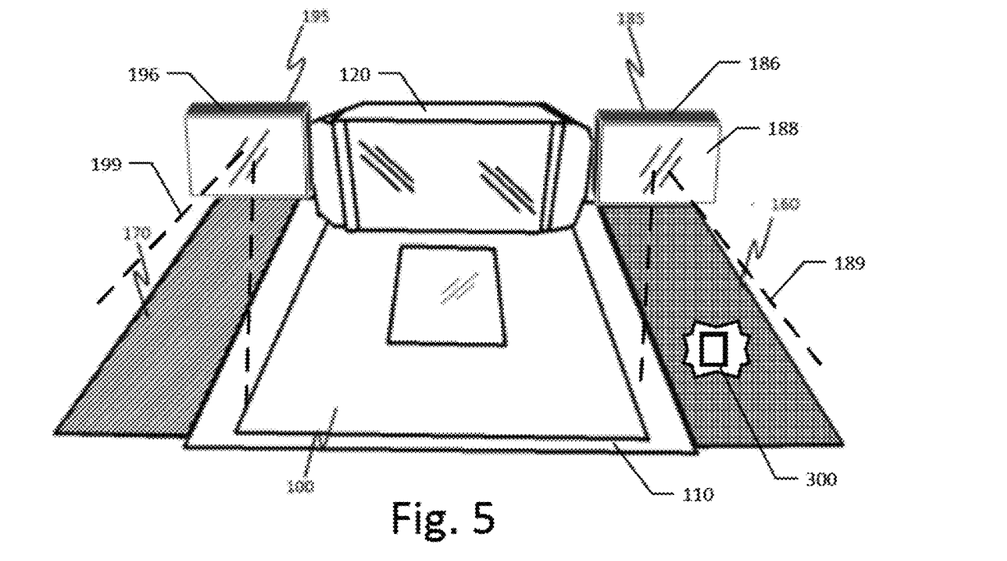
FIG. 5 is an isometric view of a scanning system, according to another embodiment.

Referring to FIGS. 4 and 5, the scanning system 100 may include imagers that expand the scanning region to include one or more portions that are offset from both the first window 140 and the second window 150. As shown, the scanning region may include an input zone 160 and an output zone 170. According to one embodiment, both the input zone 160 and the output zone 170 may be offset from both the first window 140 (i.e., does not intersect a volume of space bounded by a perimeter 142 of the first window 140 and extending away from the first enclosure 110 in a direction normal to the first window 140) and offset from the second window 150 (i.e., does not intersect a volume of space bounded by a perimeter of the second window 152 and extending away from the second enclosure 120 in a direction normal to the second window 150).

In use, the input zone 160 may function as a staging area for items to be scanned by the scanning system 100 (e.g., a customer may remove the item(s) from their bag/cart and place them in the input zone 160. After each item is moved through the scanning zone 165 (e.g., within one or more of the fields of view that passes through the first window 140 or the second window 150) the item may be placed into the output zone 170, (e.g., while the next item is selected from the input zone 160 and moved through the scanning zone 165). The scanning system 100 may be one-directional (e.g., with the input zone 160 and the output zone 170 being fixed). Alternatively, the scanning system 100 may be bidirectional, such that both the input zone 160 and the output zone 170 may act as either the staging area for items before/after scanning.

As shown in FIG. 4, the scanning system 100 may include at least one imaging device (e.g., an imaging device 180) with a field of view 184 that includes at least a portion of the input zone 160. The scanning system 100 may include at least one imager (e.g., an imaging device 190) with a field of view 194 that includes at least a portion of the output zone 170. As shown the field of view 184 and the field of view 194 may be positioned such that there is no overlap. According to one embodiment, the field of view 184, the field of view 194, or both may be positioned such that there is no overlap with any of the fields of view from the plurality of imagers (e.g., the fields of view 310, 320, 330, and 340).

The imaging device 180 and the imaging device 190 may include similar components and functional capabilities. The imaging device 180 and the imaging device 190 may each include at least one imager, similar to the imagers 210, 220, 230, and 240 as described above. According to one embodiment, at least one of the imaging devices 180, 190 may be supported by one of the one or more enclosures (e.g., the second enclosure 120).

For example, one or more of the at least one imaging devices may be mounted in one or more separate enclosures (e.g., a first imaging device enclosure 182 and a second imaging device enclosure 192 that are each secured to the second enclosure 120. Alternatively, the imaging device 180, the imaging device 190, or both may be mounted inside the second enclosure 120 aligned with another window(s) formed in the second enclosure 120 separate from the second window 150.

As shown in FIG. 5, the scanning system 100 may include at least one imaging device (e.g., an imaging device 185) with a field of view that includes at least a portion of the input zone 160. The scanning system 100 may include at least one imager (e.g., an imaging device 195) with a field of view that includes at least a portion of the output zone 170. The imaging device 185 and the imaging device 195 may include similar components and functional capabilities. The imaging device 185 and the imaging device 195 may each include at least one imager, similar to the imagers 210, 220, 230, and 240 as described above. According to one embodiment, at least one of the imaging devices may be separate from (i.e., not supported by) the first enclosure 110 and the second enclosure 120.

The imaging device 185 may include one or more imagers with respective fields of view (e.g., the field of view 189) that includes at least a portion of the input zone 160. The imaging device 195 may include one or more imagers with respective fields of view (e.g., the field of view 199) that includes at least a portion of the output zone 170. As shown the field of view 189 and the field of view 199 may be positioned such that there is no overlap. According to one embodiment, the field of view 189, the field of view 199, or both may be positioned such that there is no overlap with any of the fields of view from the plurality of imagers (e.g., the fields of view 310, 320, 330, and 340).

One or more of the at least one imaging devices may be mounted in one or more enclosures (e.g., a first imaging device enclosure 186 and a second imaging device enclosure 196 that are each physically separate from the first enclosure 110 and the second enclosure 120. According to one embodiment, at least one of the first imaging device enclosure 186 and the second imaging device enclosure 196 may be positioned adjacent to (e.g., in close physical proximity) the second enclosure 120. According to one embodiment, the first imaging device enclosure 186 may be positioned within five feet (e.g., within three feet or within one foot) of the second enclosure 120. As shown, the first imaging device enclosure 186 may be positioned with a front face 188 (through which a field of view of an imager of the imaging device 186 passes) parallel to the second window 150. The second imaging device enclosure 196 may be similarly positioned on an opposite side of the second enclosure 120.

Alternatively or additionally, one or more of the imaging devices may be mounted at a location remote from (e.g., not in close physical proximity) the second enclosure 120. According to one embodiment, the first imaging device enclosure 186 may be positioned more than five feet from the second enclosure 120 (e.g., suspended in an elevated position relative to the second enclosure 120). The scanning system 100 may include a mix of imaging devices that are in close physical proximity and that are remote from the second enclosure 120 as described above.

Figure 6:
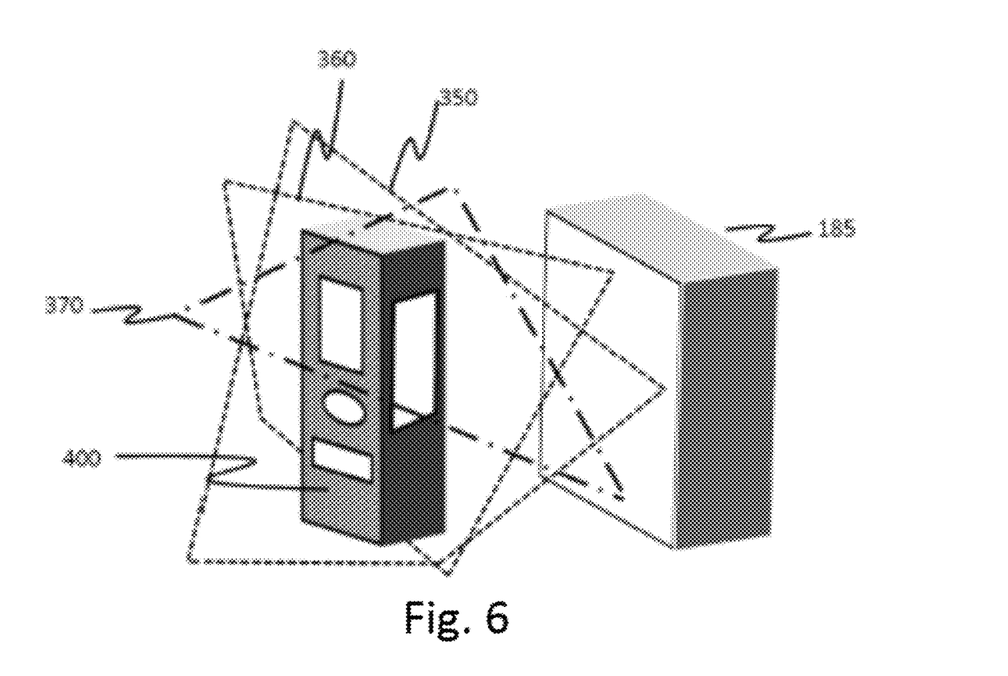
FIG. 6 is an isometric view of a portion of the scanning system illustrated in FIG. 5 scanning an item, according to one embodiment.
Figure 7:
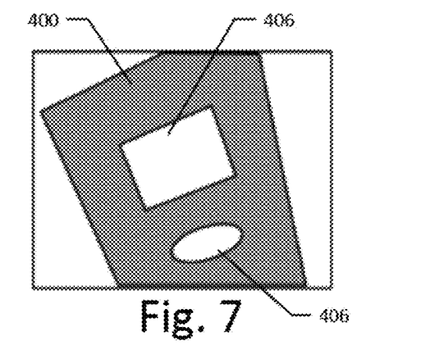
FIG. 7 is a view of a portion of an item positioned within a field of view of a scanning system, according to one embodiment.

Referring to FIGS. 4 to 6, the scanning system 100 may be used to observe an item 400 that enters or is within the input zone 160 or the output zone 170. The at least one imaging device (e.g., the imaging device 185) may include one imager, or more than one imager that have different fields of view 350, 360, and 370 that each intersect different portions of the item 400. As shown the item 400 may be positioned such that multiple fields of view from imagers of the imaging device 185 intersect the item 400 from different angles and orientations. Referring to FIGS. 7 to 14, examples of captured images of the item 400 are shown in a pre-processed (or raw) state, and in a post-processed state with key feature locations identified within the captured images. For example, one or more images of one or more portions of the item 400 may be captured by one or more of the imagers of the scanning system 100 as shown in FIGS. 7, 9, 11, and 13. The scanning system 100 may then identify key feature locations 200 within one or more of the captured images, as shown in FIGS. 8, 10, 12, and 14.

Figure 8:
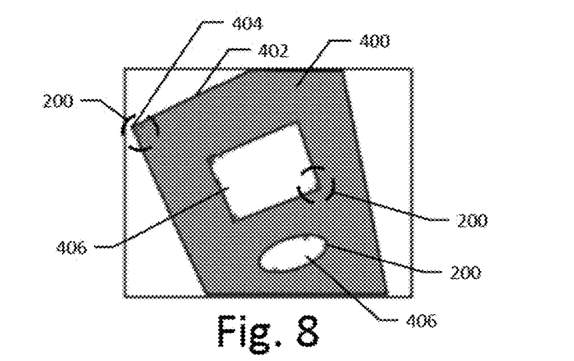
FIG. 8 is a view of the portion of the item illustrated in FIG. 7 with key feature locations on the portion of the item identified, according to one embodiment.
Figure 9:
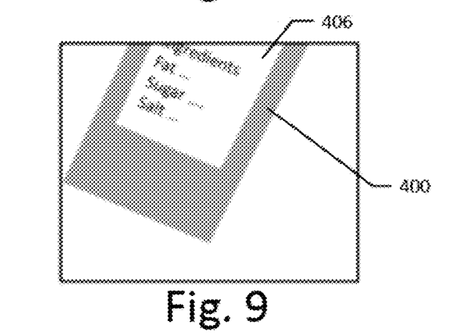
FIG. 9 is a view of a portion of an item positioned within a field of view of a scanning system, according to one embodiment.
Figure 10:
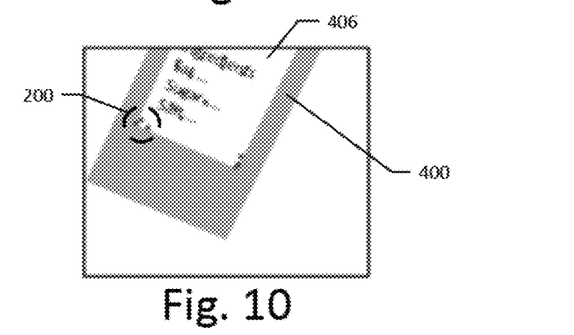
FIG. 10 is a view of the portion of the item illustrated in FIG. 9 with key feature locations on the portion of the item identified, according to one embodiment.
Figure 11:
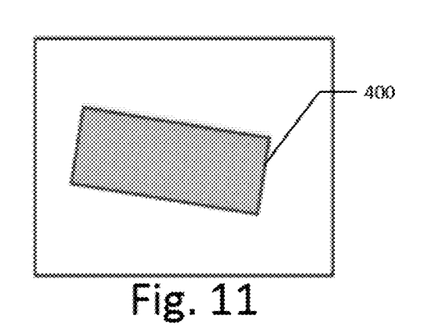
FIG. 11 is a view of a portion of an item positioned within a field of view of a scanning system, according to one embodiment.
Figure 12:
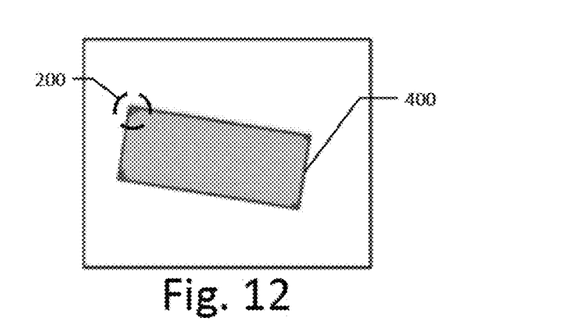
FIG. 12 is a view of the portion of the item illustrated in FIG. 11 with key feature locations on the portion of the item identified, according to one embodiment.
Figure 13:
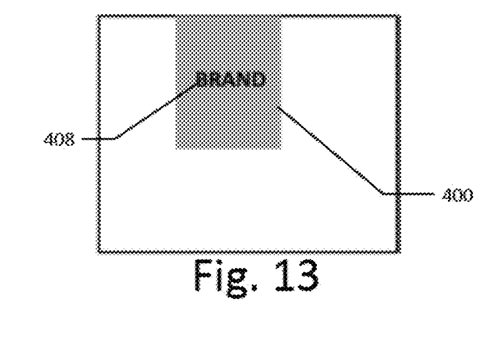
FIG. 13 is a view of a portion of an item positioned within a field of view of a scanning system, according to one embodiment.
Figure 14:
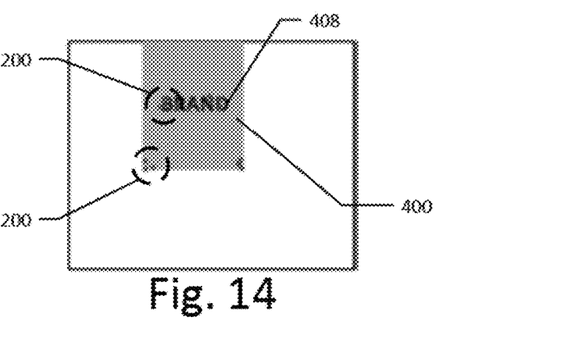
FIG. 14 is a view of the portion of the item illustrated in FIG. 13 with key feature locations on the portion of the item identified, according to one embodiment.

The key feature locations 200 may indicate a shape (e.g., at least a portion of at least one side) of the item 400 (e.g., such that at least some of the key feature locations 200 are located on a perimeter 402 of the item 400, for example a corner 404 of the item 400, as shown in FIGS. 8 and 12). The key feature locations 200 may indicate a size, shape, location, or any combination thereof of one or more sections of the item 400 (including an entirety of the item 400 itself). For example, the key feature locations 200 may be located on a perimeter (e.g., a corner) of a label 406, illustration, etc. on an exterior surface of the item 400, as shown in FIGS. 8 and 10. The key feature locations 200 may indicate a size, font, location, or any combination thereof of text 408 on the item 400. The text 408 may include information about the item (e.g., a list of ingredients as shown in FIG. 10). According to one embodiment, the text 408 may identify the item (e.g., the brand, specific product, etc.) as shown in FIG. 14.

Referring to FIGS. 1 to 15, a method of detecting theft (e.g., in a retail space) may include operation 1500 of a scanning system (e.g., the scanning system 100). The method 1500 may initiate with one or more items (e.g., the item 400) being positioned in the input zone 160. At operation 1502, the scanning system 100 monitors for activity (e.g., by one or more sensors 300) within the input zone 160 (e.g., as the item 400 is placed in the input zone 160, as the item 400 is selected for scanning and moved through the input zone 160, etc.). Upon detection of activity, at operation 1504, one or more of the plurality of imagers of the scanning system 100 (e.g., the imaging device 180, 185) may collect a series of images of the item 400.

Figure 15:
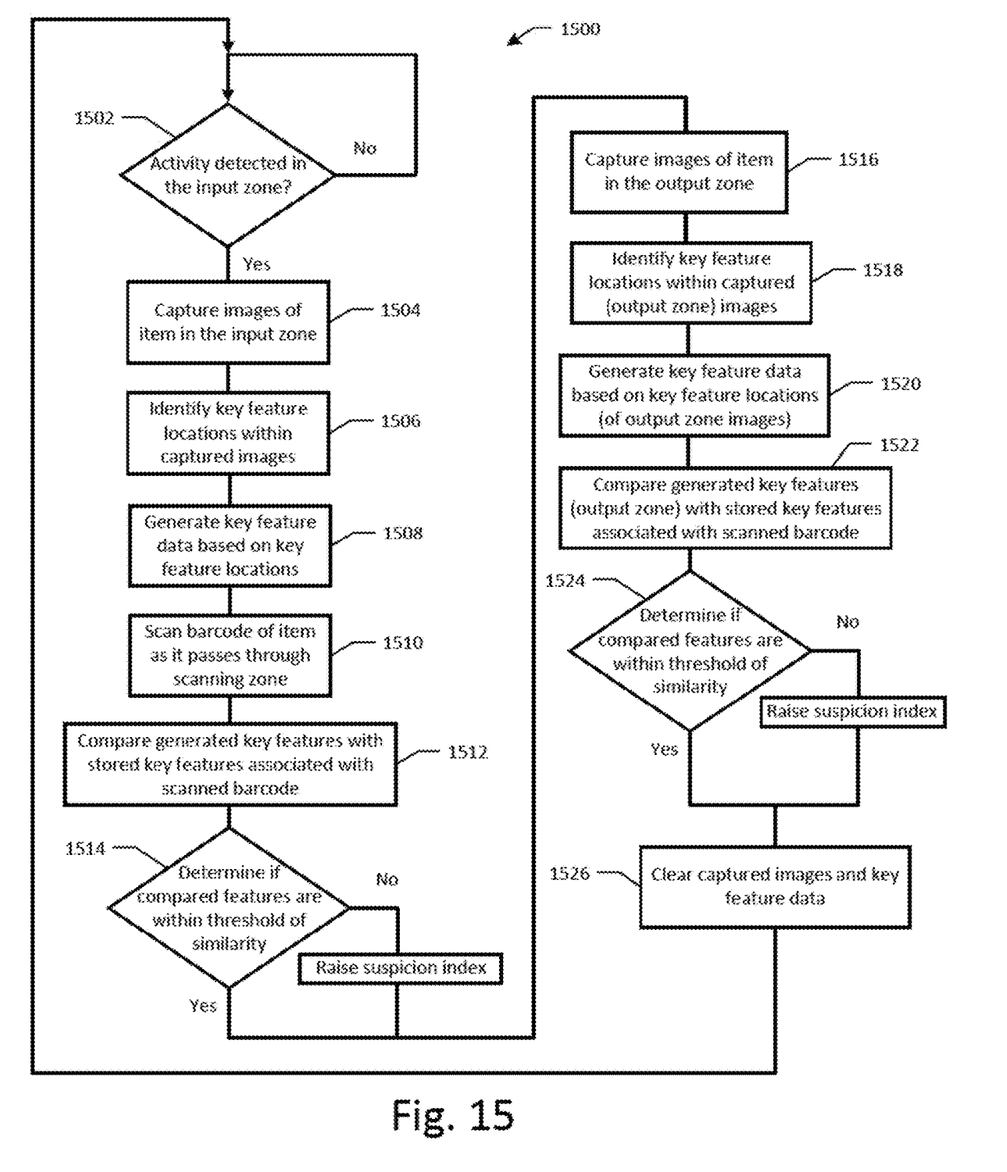
FIG. 15 is a flow chart diagram illustrating a method of detecting theft according to one embodiment.

The collection of the series of images may be triggered by the scanning system 100 sensing activity (e.g., motion) in the input zone 160. Alternatively or additionally, the collection of the series of images may be triggered by the scanning system 100 sensing a change in weight in the input zone 160 (e.g., as the item 400 is placed therein). Thus, the one or more sensors 300 of the scanning system 100 may include, for example, motion sensors, scales, etc. to detect the activity mentioned above.

As images of the item 400 are collected, at operation 1506, key feature locations within the captured images may be identified. At operation 1508, the captured images/key feature locations may be analyzed (e.g., by one or more processors 104 of the scanning system 100) and a database (e.g., a temporary, locally stored database) of key feature locations 200 may be generated. The collected images may include multiple views of the item 400 (e.g., views of different portions on a same side of the item 400 and/or views of different sides of the same item 400). The multiple views may be collected as a result of the item 400 changing orientation and position as it moves, and/or may be a result of the scanning system 100 including multiple imagers (e.g., multiple imaging cameras, for example within the imaging device 185). The collection of multiple views of different portions of the item 400 may improve detection later in the process.

According to one embodiment, for at least some of the collected images of the item 400, additional augmented images may be generated (e.g., on-the-fly) which artificially represent the item 400 at different rotations, positions, distances, etc. by applying standard image processing transforms. From this set of collected (and, if generated, augmented) images, a set of searchable key features is placed in the temporary database. Because this method uses simpler, key feature representations of items, rather than the raw image of items, the extraction of the key features and a temporary database creation may be done very rapidly with suitable processing.

As the item 400 is moved over one or more of the scanners 102 (e.g., positioned within one or both of the first enclosure 110 and the second enclosure 120), additional images may be collected (e.g., by one or more of the imaging cameras 210, 220, 230, and 240) for use in expanding the database of key features for the item 400. The one or more sensors 300 of the scanning system 100 may trigger the start of the collection of these additional images based on detected activity in the scanning zone 165 (e.g., positioned between the input zone 160 and the output zone 170).

The scanning system 100 may associate the identity of the particular imager that captured an image from which key features were identified (or derived in the case of augmentation) to enable comparisons. The scanning system 100 may evaluate and assign a quality rating to captured images so as to enhance the reliability of the captured images. The scanning system 100 may compare the key features of the item 400 identified from the images captured while the item 400 is in the input zone 160 to the key features of the item 400 identified from the images captured while the item 400 is in the scanning zone 165. If the key features from the scanning zone 165 and the input zone 160 do not indicate sufficient similarity, yet the quality rating of the captured images is high, then based upon a merit function, a suspicious activity flag may be raised.

The scanning system 100 may include a suspicion index (e.g., a scale, a plurality of categories, etc.). The scanning system 100 may evaluate the comparison of the captured images from the input zone 160 and the scanning zone 165 as not an absolute indication of subterfuge, and merely indicate an increased level of suspicion (i.e., the suspicion index) regarding the transaction involving the item 400. A poor match between captures from the input zone 160 and the scanning zone 165 may be the result of poor or absent images resulting in no or weak key feature generation. Additionally, one set of images may have been collected from a completely different view of the item 400 relative to the other set of images. If the number or quality of the key features from an imager is below a set threshold, the matching process for those particular images may not be performed.

At operation 1510, the one or more scanners 102 may collect data from the item 400 (e.g., by scanning a barcode or similar indicator on the item 400 while the item 400 passes through the scanning zone 165). The data collected from the scanner 102 may identify/be associated with key features of the item 400. According to one embodiment, the scanning system 100 includes at least one nontransitory computer-readable media 106 that stores a data set 108, which includes the key features of the item 400 that are associated with a particular machine-readable symbol. The at least one nontransitory computer-readable media 106 may include executable instructions, or data, which when executed by the one or more processors 104 of the scanning system 100, identify and retrieve the key features of the item 400 that are associated with a particular machine-readable symbol that was just scanned by the one or more scanners 102. The at least one nontransitory computer-readable media 106 may be enclosed within the one or more enclosures of the scanning system 100, or may be positioned remote from the one or more enclosures and communicatively coupled (e.g., wired, wireless, etc.) to components of the scanning system 100 (e.g., the plurality of imagers, the one or more scanners 102, etc.).

Similar to the comparison of images collected from the input zone 160 and the scanning zone 165, the key features indicated by the scanners' 102 collected data (e.g., retrieved from the data set 108) and the key features derived from the images captured in the input zone 160, the scanning zone 165, or both may be compared at operation 1512.

At operation 1514, the scanning system 100 may determine if the compared collected data (e.g., retrieved from the data set 108) and the key features derived from the images captured in the input zone 160, the scanning zone 165, or both are within a threshold of similarity. The scanning system 100 may evaluate various levels of matches or mismatches of the key features from one of the zones of the scanning system 100 to another of the zones of the scanning system 100, along with other data such as color histogram data from each zone, timing of appearance in each zone, etc. to determine the probability of theft occurrence.

Upon determination that the key features derived from the images captured in the input zone 160, the scanning zone 165, or both are within a threshold of similarity, no action may be taken. Upon determination that the key features derived from the images captured in the input zone 160, the scanning zone 165, or both are not within the predetermined threshold of similarity, the suspicion index may be raised, and further action(s) may be taken (e.g., depending on the severity of the deviation between the compared key features).

Based upon this analysis, an appropriate indication may be sent to an attendant, security manager, etc. The scanning system 100 may enable an indicator that is observable by the customer. However, as such a feature may allow thieves to learn the scanning system's 100 operation and sensitivities, this feature may also be excluded such that only indicators hidden from the customer are triggered by the scanning system 100 in the event of a determination of a possible theft beyond a predetermined threshold.

Optionally, at operation 1516, additional images may be captured while the item 400 is in the output zone 170 (e.g., similar to as described in relation to operation 1504 above). At operation 1518, key features may be identified within the captured images collected from the output zone 170 (e.g., similar to as described in relation to operation 1506 above). At operation 1520, key features may be generated from the identified key feature locations within the captured images collected from the output zone 170 (e.g., similar to as described in relation to operation 1508 above). At operation 1522, the images and/or key features generated from the images captured in the output zone 170 may be compared to the images and/or key features generated from the scanning zone 165 and/or the input zone 160 (e.g., similar to as described in relation to operation 1512 above).

At operation 1524, the scanning system 100 may determine if the compared collected data (e.g., retrieved from the data set 108) and the key features derived from the images captured in the output zone 170 are within the predetermined threshold of similarity (e.g., similar to as described in relation to operation 1514 above). Upon determination that the key features retrieved from the data set 108 and the key features derived from the images captured in the output zone 170 are within a threshold of similarity (e.g., the predetermined threshold of similarity), no action may be taken. Upon determination that the compared key features are not within the predetermined threshold of similarity, the suspicion index may be raised, and further action(s) may be taken (e.g., depending on the severity of the deviation between the compared key features.

Depending upon the quality of the images/data and the quality of match between the compared key features, the suspicion index may be further raised or ignored. For example, a repeated discrepancy from the input zone 160 to the scanning zone 165, and then again from the scanning zone 165 to the output zone 170 may further raise the suspicion index (e.g., beyond the raise in suspicion level that would have resulted from individual discrepancies. At operation 1526, once the item 400 is in the output zone 170 and the key feature data has been processed, the temporary database of key features may be expunged and readied for arrival of a new item. The database may also be cleared after some amount of elapsed time without activity. According to one embodiment, the database may be cleared prior to starting the method again with a new item.

The scanning system 100 may evaluate various levels of matches or mismatches of the key features from one of the zones of the scanning system 100 to another of the zones of the scanning system 100, along with other data such as color histogram data from each zone, timing of appearance in each zone, etc. to determine the probability of theft occurrence. Based upon this analysis, an appropriate indication may be sent to an attendant, security manager, etc. The scanning system 100 may enable an indicator that is observable by the customer. However, as such a feature may allow thieves to learn the scanning system's 100 operation and sensitivities, this feature may also be excluded such that only indicators hidden from the customer are triggered by the scanning system 100 in the event of a determination of a possible theft beyond a predetermined threshold.

Referring to FIGS. 1 to 16, a method of detecting theft (e.g., in a retail space) may include operation 1600 of a scanning system (e.g., the scanning system 100). Generally, the method 1600 may be similar to the method 1500 as described above, with the primary difference being the type of data being retrieved, generated, and compared. Thus, the description of the method 1500 is applicable to the method 1600 as if repeated herein. The method 1600 may include capture, identification, generation, and retrieval of gross features (rather than key features as described in the method 1500). Gross features of an item may include characteristics such as prominent/dominant colors, absent colors, color mixes, color shape, item shape, item temperature, item weight, etc., which may be detectable over greater distances, orientations, and speeds compared to fine features of the item (e.g., specific words, images, etc.).

Figure 16:
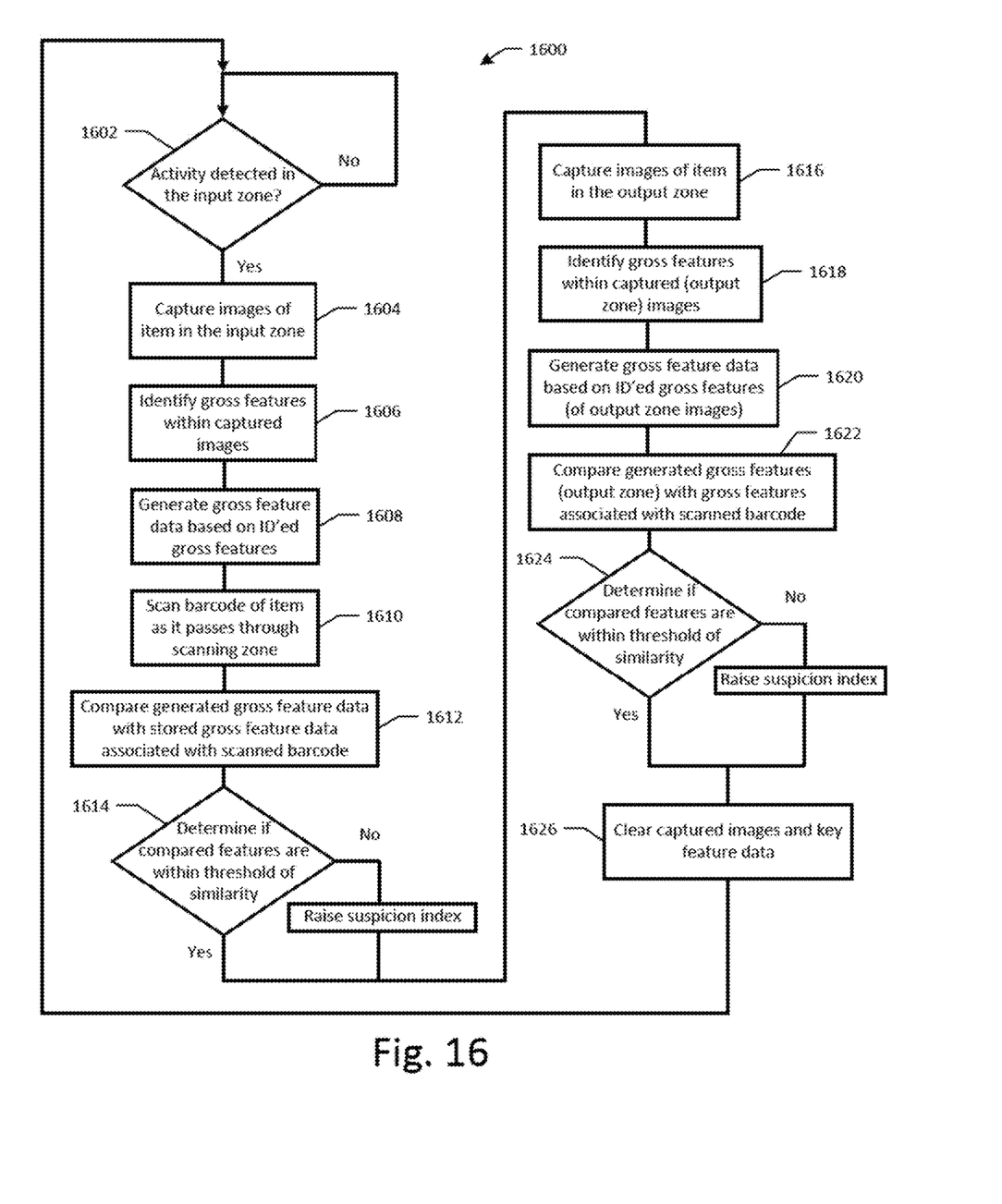
FIG. 16 is a flow chart diagram illustrating a method of detecting theft according to one embodiment.

The method of operation 1600 of the scanning system 100 may initiate with one or more items (e.g., the item 400) being positioned in the input zone 160. At operation 1602, the scanning system 100 monitors for activity (e.g., by one or more sensors 300) within the input zone 160 (e.g., as the item 400 is placed in the input zone 160, as the item 400 is selected for scanning and moved through the input zone 160, etc.). Upon detection of activity, at operation 1604, one or more of the plurality of imagers of the scanning system 100 (e.g., the imaging device 180, 185) may collect a series of images of the item 400.

The collection of the series of images may be triggered by the scanning system 100 sensing activity (e.g., motion) in the input zone 160. Alternatively or additionally, the collection of the series of images may be triggered by the scanning system 100 sensing a change in weight in the input zone 160 (e.g., as the item 400 is placed therein). Thus, the one or more sensors 300 of the scanning system 100 may include, for example, motion sensors, scales, etc. to detect the activity mentioned above.

As images of the item 400 are collected, at operation 1606, gross features of the item 400 within the captured images may be identified. At operation 1608, the captured images/gross features may be analyzed (e.g., by one or more processors 104 of the scanning system 100) and a database (e.g., a temporary, locally stored database) of gross feature locations 200 may be generated. The collected images may include multiple views of the item 400 (e.g., views of different portions on a same side of the item 400 and/or views of different sides of the same item 400). The multiple views may be collected as a result of the item 400 changing orientation and position as it moves, and/or may be a result of the scanning system 100 including multiple imagers (e.g., multiple imaging cameras, for example within the imaging device 185). The collection of multiple views of different portions of the item 400 may improve detection later in the process.

At operation 1610, the one or more scanners 102 may collect data from the item 400 (e.g., by scanning a barcode, machine-readable symbol, or similar indicator on the item 400 while the item 400 passes through the scanning zone 165). The data collected from the scanner 102 may identify/be associated with gross features of the item 400. According to one embodiment, the scanning system 100 includes at least one nontransitory computer-readable media 106 that stores a data set 108, which includes the gross features of the item 400 that are associated with a particular machine-readable symbol.

The at least one nontransitory computer-readable media 106 may include executable instructions, or data, which when executed by the one or more processors 104 of the scanning system 100, identify and retrieve the gross features of the item 400 that are associated with a particular machine-readable symbol that was just scanned by the one or more scanners 102. The at least one nontransitory computer-readable media 106 may be enclosed within the one or more enclosures of the scanning system 100, or may be positioned remote from the one or more enclosures and communicatively coupled (e.g., wired, wireless, etc.) to components of the scanning system 100 (e.g., the plurality of imagers, the one or more scanners 102, etc.).

At operation 1612, the gross features indicated by the scanners' 102 collected data (e.g., retrieved from the data set 108) and the gross features derived from the images captured in the input zone 160, the scanning zone 165, or both may be compared.

At operation 1614, the scanning system 100 may determine if the compared collected data (e.g., retrieved from the data set 108) and the gross features derived from the images captured in the input zone 160, the scanning zone 165, or both are within a threshold of similarity. The scanning system 100 may evaluate various levels of matches or mismatches of the gross features from one of the zones of the scanning system 100 to another of the zones of the scanning system 100, along with other data such as color histogram data from each zone, timing of appearance in each zone, etc. to determine the probability of theft occurrence.

According to one embodiment, the gross feature information may include colors of the item, color proportions of the item (e.g., 50% red and 50% blue), color shapes on the item, weight of the item (e.g., a specific weight or a weight category such as light, medium, heavy), shape of the item, temperature of the item, or any combination thereof. The scanning system may identify a list of most prominent colors in the generated gross feature data and determine whether the list of most prominent colors from the stored gross feature data matches the identified list of most prominent colors from the generated gross feature data. The stored gross feature data may include a list of one or more absent colors, and the method may include determining whether the generated gross feature data includes any colors on the list of one or more absent colors.

Upon determination that the gross features derived from the images captured in the input zone 160, the scanning zone 165, or both are within a threshold of similarity, no action may be taken. Upon determination that the gross features derived from the images captured in the input zone 160, the scanning zone 165, or both are not within the predetermined threshold of similarity, the suspicion index may be raised, and further action(s) may be taken (e.g., depending on the severity of the deviation between the compared gross features.

Based upon this analysis, an appropriate indication may be sent to an attendant, security manager, etc. The scanning system 100 may enable an indicator that is observable by the customer. However, as such a feature may allow thieves to learn the scanning system's 100 operation and sensitivities, this feature may also be excluded such that only indicators hidden from the customer are triggered by the scanning system 100 in the event of a determination of a possible theft beyond a predetermined threshold.

Optionally, at operation 1616, additional images may be captured while the item 400 is in the output zone 170 (e.g., similar to as described in relation to operation 1604 above). At operation 1618, gross features may be identified within the captured images collected from the output zone 170 (e.g., similar to as described in relation to operation 1606 above). At operation 1620, gross features may be generated from the identified gross features within the captured images collected from the output zone 170 (e.g., similar to as described in relation to operation 1608 above). At operation 1622, the images and/or gross features generated from the images captured in the output zone 170 may be compared to the images and/or gross features generated from the scanning zone 165 and/or the input zone 160 (e.g., similar to as described in relation to operation 1612 above).

At operation 1624, the scanning system 100 may determine if the compared collected data (e.g., retrieved from the data set 108) and the gross features derived from the images captured in the output zone 170 are within the predetermined threshold of similarity (e.g., similar to as described in relation to operation 1614 above). Upon determination that the gross features retrieved from the data set 108 and the gross features derived from the images captured in the output zone 170 are within a threshold of similarity (e.g., the predetermined threshold of similarity), no action may be taken. Upon determination that the compared gross features are not within the predetermined threshold of similarity, the suspicion index may be raised, and further action(s) may be taken (e.g., depending on the severity of the deviation between the compared gross features.

Depending upon the quality of the images/data and the quality of match between the compared gross features, the suspicion index may be further raised or ignored. For example, a repeated discrepancy from the input zone 160 to the scanning zone 165, and then again from the scanning zone 165 to the output zone 170 may further raise the suspicion index (e.g., beyond the raise in suspicion level that would have resulted from individual discrepancies. At operation 1626, once the item 400 is in the output zone 170 and the gross feature data has been processed, the temporary database of gross features may be expunged and readied for arrival of a new item. The database may also be cleared after some amount of elapsed time without activity. According to one embodiment, the database may be cleared prior to starting the method again with a new item.

Although described separately above, a method of detecting theft may include a combination of the method 1500 and the method 1600. According to one embodiment, the scanning system 100 may be operable to perform just the method 1500, just the method 1600, and both the methods 1500 and 1600 either alternatively or simultaneously.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The various embodiments described above can be combined to provide further embodiments.

Many of the methods described herein can be performed with variations. For example, many of the methods may include additional acts, omit some acts, and/or perform acts in a different order than as illustrated or described.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:
1. A scanning system to monitor for and detect theft in a retail environment, the scanning system comprising:

a scanner configured to read machine-readable symbols, the scanner having a scanner field of view including a scanning zone, and the scanner positioned and oriented such that the scanner reads a machine-readable symbol on an item when the item is within the scanner field of view;

at least one imaging camera having a field of view that includes an input zone and an output zone that are different than the scanning zone;

nontransitory computer-readable media;

a processor operably coupled with the scanner, the at least one imaging camera, and the nontransitory computer-readable media, wherein the processor is configured to:
generate at least one of a first set of key feature data identified from images captured of the item passing through the input zone of the scanning system or a second set of key feature data identified from the plurality of images of the item passing through a first zone of the scanning system;
store the generated first set of key feature data and/or the generated second key feature data in a temporary data set created on the nontransitory computer-readable media;
generate a third set of key feature data from images captured of the item passing through the output zone of the scanning system;
compare the third set of key feature data from one with the first set of key feature data and/or the second set of key feature data retrieved from the nontransitory computer-readable media;
determine whether the third set of key feature data matches the first set of key feature data and/or the second set of key feature data to a degree sufficient to surpass a predetermined threshold and raise a suspicion index in response to a determination that the third set of key feature data fails to match the first set of key feature data and/or the second set of key feature data to a degree sufficient to surpass the predetermined threshold; and
clear the temporary data set from the nontransitory computer-readable medium after the comparing and determining steps are completed.

2. The scanning system of claim 1 wherein the at least one nontransitory computer-readable media is enclosed within an enclosure of the scanning system.

3. The scanning system of claim 1 wherein the at least one imaging camera includes:
a first imaging camera having a first unique field of view encompassing the input zone that does not overlap with the scanning zone encompassed by the scanner field of view; and
a second imaging camera having a second unique field of view encompassing the output zone that does not overlap with scanning zone encompassed by the scanner field of view.

4. The scanning system of claim 1 wherein the processor is further configured to:
identify a first set of key feature locations for the item based on a first set of the captured images from the first imaging camera, the first set of captured images consisting of images captured prior to the scanner reading the machine readable symbol of the item, and generate the first set of key feature data for the item based on the first set of key feature locations; and
identify a second set of key feature locations for the item based on a second set of the captured images from the second imaging camera, the second set of captured images consisting of images captured after the scanner reads the machine readable symbol of the item, and generate the second set of key feature data for the item based on the second set of key feature locations.

5. The scanning system of claim 4 wherein the processor is further configured to:
compare the stored first set of key feature data with the second set of key feature data; and
determine whether the first set of key feature data matches the second set of key feature data to a degree sufficient to surpass the predetermined threshold and raise the suspicion index in response to a determination that the first set of key feature data fails to match the second set of key feature data to a degree sufficient to surpass the predetermined threshold.

6. The scanning system of claim 5 wherein the processor is configured to:
raise the suspicion index by a first amount as a result of the second set of key feature data failing to match the first set of key feature data to a degree sufficient to surpass the predetermined threshold when the item passes from the input zone to the scanning zone;
raise the suspicion index by a second amount as a result of the third set of key feature data failing to match the second set of key feature data to a degree sufficient to surpass the predetermined threshold when the item passes from the scanning zone to the output zone; and
raise the suspicion index by a third amount as a result of a failing to match the first set of key feature data and the second set of key feature data to a degree sufficient to surpass the predetermined threshold when the item passes from the input zone to the scanning zone followed by a failing to match the third set of key feature data and the second set of key feature data to a degree sufficient to surpass the predetermined threshold when the item passes from the scanning zone to the output zone, the third amount is greater than a summation of the first amount and the second amount.

7. A method of detecting theft in a retail space, the method comprising:
capturing a plurality of images of an item passing through different defined zones around a scanning system in the retail space;
generating, by one or more processors, a first set of key feature data identified from the plurality of images of the item passing through a first zone of the scanning system;
storing the first set of key feature data in a temporary data set created on a nontransitory computer-readable media;
generating, by the one or more processors, a second set of key feature data for the item identified from the plurality of images of the item passing through a second zone of the scanning system that is different than the first zone;
comparing, by the one or more processors, the first set of key feature data with the second set of key feature data;
determining, by the one or more processors, whether the first set of key feature data matches the second set of key feature data to a degree sufficient to surpass a predetermined threshold and raising a suspicion index in response to a determination that the first key feature data fails to match the second key feature data to a degree sufficient to surpass the predetermined threshold; and clearing the temporary data set from the nontransitory computer-readable medium after the comparing and determining steps are completed by the one or more processors.

8. The method of claim 7, wherein clearing the temporary data set from the nontransitory computer-readable medium is performed in response to a determination that the first key feature data successfully matches the second key feature data to a degree sufficient to surpass the predetermined threshold.

9. The method of claim 7 further comprising scanning a machine-readable symbol attached to the item, wherein the plurality of images includes:
 a first subset of images captured prior to scanning the machine-readable symbol attached to the item; and
 a second subset of images captured after scanning the machine-readable symbol attached to the item.

10. A method of detecting theft in a retail space, the method comprising:
 capturing a plurality of images of an item passing through a scanning zone;
 scanning a machine-readable symbol in close proximity to the item;
 reading, by one or more processors of a scanning system, encoded gross feature data carried by the item passing through the scanning zone;
 identifying, by one or more processors, gross feature information of the item based on the captured plurality of images of the item, the gross feature information including: prominent colors of the item, absent colors of the item, color proportions of the item, color shapes of the item, weight of the item, weight category of the item, shape of the item, temperature of the item, or any combination thereof;
 generating, by the one or more processors, gross feature data for the item based on the identified gross feature information;
 comparing, by the one or more processors, the retrieved encoded gross feature data with the generated gross feature data; and
 determining, by the one or more processors, whether the retrieved gross feature data matches the generated gross feature data to a degree sufficient to surpass a predetermined threshold.

11. The scanning system of claim 1 wherein the at least one imaging camera includes an overhead camera.

12. The method of claim 7, wherein the first zone of the scanning system is an input zone, and the second zone of the scanning system is a scanning zone.

13. The method of claim 7, wherein the first zone of the scanning system is a scanning zone, and the second zone of the scanning system is an output zone.

14. The method of claim 13, wherein capturing the plurality of images includes capturing images of the item within the scanning zone from multiple unique views from a plurality of imagers within a scanner of the scanning system.

15. The method of claim 7, further comprising prior to clearing the temporary data set from the nontransitory computer-readable media:
 storing the second set of key feature data in the temporary data set created on the nontransitory computer-readable media;
 generating, by the one or more processors, a third set of key feature data for the item identified from the plurality of images of the item passing through a third zone of the scanning system that is different than the first zone and the second zone;
 comparing, by the one or more processors, the third set of key feature data with the first set of key feature data and/or the second set of key feature data retrieved from the nontransitory computer-readable media; and
 determining, by the one or more processors, whether the third set of key feature data matches the first set of key feature data and/or the second set of key feature data to a degree sufficient to surpass a predetermined threshold and raising a suspicion index in response to a determination that the third key feature data fails to match the first key feature data and/or the second key feature data to a degree sufficient to surpass the predetermined threshold.

16. The method of claim 7, wherein the first zone of the scanning system is an input zone, the second zone of the scanning system is a scanning zone, and the third zone of the scanning system is an output zone.

17. The method of claim 7, wherein clearing the temporary data set from the nontransitory computer-readable medium is performed in response to completion of a transaction having multiple items scanned.

18. The method of claim 7, wherein clearing the temporary data set from the nontransitory computer-readable medium is performed after each item transfer is completed during a same transaction.

19. The method of claim 7, further comprising:
 generating, by the one or more processors, additional augmented images from the plurality of images collected of the item passing through the first zone of the scanning system, the augmented images representing the item at one or more different rotations, positions, and/or distances; and
 generating, by the one or more processors, another set of key feature data identified from the augmented images to include with the first set of key features stored in the temporary data set for subsequent comparisons.

20. The method of claim 7, wherein raising the suspicion index includes raising a suspicious activity flag.

* * * * *